United States Patent Office 3,292,206
Patented Dec. 20, 1966

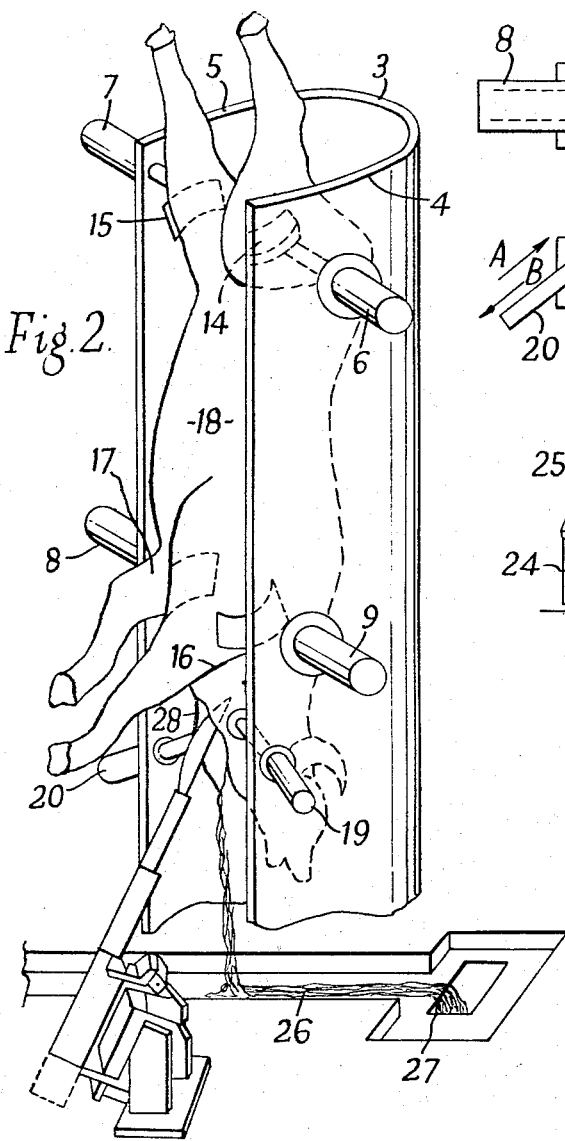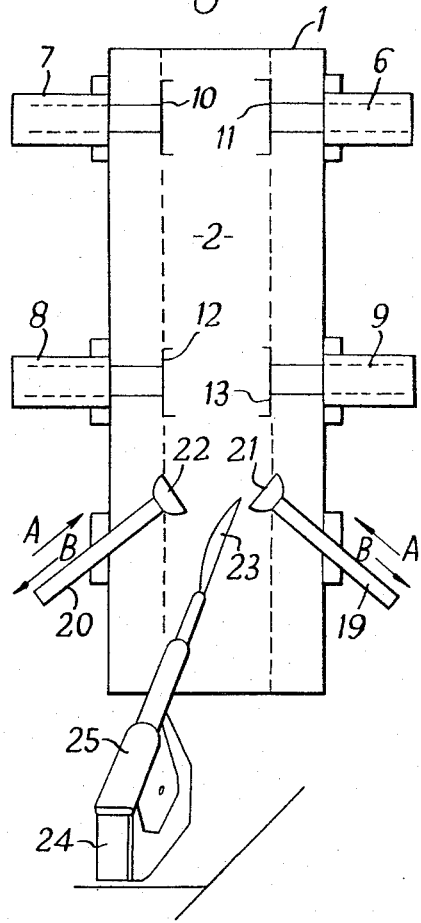

3,292,206
SLAUGHTERING APPARATUS
Georges Aubert, 6 Rue Pierre Dupre,
Marseille, France
Filed Feb. 10, 1965, Ser. No. 431,529
Claims priority, application France, Feb. 10, 1964,
20,462, Patent 1,382,677
2 Claims. (Cl. 17—1)

As soon as animals have been slaughtered for food, the bleeding is the operation which requires the maximum of skill on the part of the expert, so that it is only with difficulty that it can be made automatic.

All the blood, in fact, must be caused to flow out of the animal very rapidly while it is still alive.

The purpose of the invention is to provide a device to be included in an automatic slaughtering chain and enabling an animal such as an ox or bullock to be bled mechanically with maximum speed and accuracy.

It is characterized by the means used, considered both in conjunction with one another and independently of one another, and more particularly by a vertical casing of cylindrical cross section, with an opening on the front, in which the animal, transported automatically, is placed with its head downwards, the animal being positioned by two groups of jacks placed at different heights, the head of each jack being fitted with a stabilizing device operating by pressure and securing the animal in the zones corresponding to the hindquarters and the shoulders.

Two oblique jacks equipped with suction grip cups are placed on the two sides of the zone corresponding to the neck, in order to stretch the cutting area, situated opposite a blade mounted on an adjustable support and operated by a jack.

In the accompanying drawings, illustrating by way of an example, and without any limitative effect, one possible form of the device to which the invention relates:

FIG. 1 is an elevation of the entire system;

FIG. 2 shows, in perspective, how the device is applied.

The device consists of a vertical positioning case 1, of semi-cylindrical section, with an opening 2 in the front, and with a standard surrounding surface 3, of circular section, at the rear, with the sides 4 and 5.

Two groups of jacks 6, 9 and 7, 8, arranged symmetrically, are mounted on the lateral walls, their thrust bars being equipped with gripping and positioning devices 11, 13, 10, 12.

These jacks are on a level with the hindquarters 14 and 15 and the forequarters 16 and 17 of the animal 18.

On a level with the throat, two symmetrical jacks 19 and 20, placed obliquely, are fitted with pneumatic suction grip cups 21 and 22 on their bars.

A blade 23, mounted on an adjustable support 24 and a jack 25 is situated in the continuation of the space included between the two suction grip cups.

A bleeding gutter 26 and a collector 27 are provided in the vicinity of the apparatus.

The advantages offered by this device will thus be evident.

The animal 18, mechanically transported from the slaughtering station, is placed in the case 1.

It is positioned by the jacks 6, 7, 8 and 9, which by means of their fittings 14, 15, 16 and 17, stabilize it in the position required, i.e. with its head downwards and with its throat facing the opening 2.

The jacks 19 and 20 are set in operation and the suction grip cups 21 and 22 applied to each side of the animal's neck by a movement in the direction indicated by the arrows A.

As soon as the vacuum is produced, the jack is caused to move to the rear, in the direction shown by the arrow B, in such a way as to stretch the space 28. This action facilitates the entry of the blade 23, operated by the jack 25 and guided by the base 24.

The animals being approximately equal in size, the blade does not have to be regulated, and owing to the direction in which the blade points, and its length, the stretching of the incision zone enables the arteries to be cut, whatever the position of the animal.

The blood flows off through the gutter 26 and accumulates in the collector 27.

This system makes it possible to avoid the loss of time and the risk of accident arising in the event of a reflex on the part of the animal or in the event of the knife slipping out of the operator's hand.

The mechanization of the operation also enables deep and even incisions to be made, without undue damage to the part being cut.

Furthermore, the stretching of the incision area by the suction grip cups enables the blood to flow out more quickly, thus increasing the rapidity of the bleeding process.

The shapes, dimensions and arrangements adopted for the various elements of the invention may nevertheless vary within the limits allowed by equivalent devices, as may also the materials used for their manufacture, without thereby departing from the general principle of the invention described in the foregoing.

I claim:

1. Apparatus for the mechanized bleeding of slaughtered animals in abattoirs, comprising a casing to receive the carcass, means on said casing to engage with and hold the carcass in head-down position therein, opposed suction devices movably mounted in the casing at a position corresponding to the throat of the carcass and adapted to grip and stretch the skin of the carcass at the throat, and a power-operated knife positioned to reciprocate in the casing at the position of the throat of the carcass.

2. Apparatus for the mechanized bleeding of slaughtered animals in abattoirs, comprising a casing to receive the carcass, a plurality of hydraulic jacks mounted on said casing and each including a piston rod extending inwardly of the casing, means on said piston rods for engaging with and holding a carcass in the head-down position, an opposed pair of other hydraulic jacks mounted on said casing at a lower position thereof and each including a piston rod extending inwardly of the casing, suction cups on the piston rods of said other lower hydraulic jacks to grip the skin of the carcass at the throat for stretching, and a power-operated knife positioned to reciprocate in the casing at the position of the throat of the carcass.

References Cited by the Examiner
UNITED STATES PATENTS
1,603,562   10/1926   Taylor _____ 17—44

FOREIGN PATENTS
65,961   12/1892   Germany.

ALDRICH F. MEDBERY, *Acting Primary Examiner.*
LUCIE H. LAUDENSLAGER, *Examiner.*